United States Patent Office 3,753,986
Patented Aug. 21, 1973

3,753,986
TRIAZINE HERBICIDES
Gopal H. Singhal, Westfield, and Heide Roebke, Avenel, N.J., assignors to Esso Research and Engineering Company
No Drawing. Filed Apr. 2, 1970, Ser. No. 25,237
Int. Cl. C07d 55/20, 55/22
U.S. Cl. 260—249.6                    21 Claims

ABSTRACT OF THE DISCLOSURE

Triazine compounds represented by the structural formula:

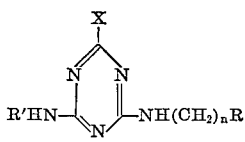

wherein X is one selected from the group consisting of Cl, Br, N$_3$, C$_1$–C$_6$ thioalkyl, C$_2$–C$_6$ alkylthioalkylthio, C$_2$–C$_6$ alkylsulfonylalkylthio, C$_2$–C$_6$ alkylsulfoxyalkylthio, C$_2$–C$_6$ alkoxyalkylthio, C$_1$–C$_6$ chloroalkylthio, C$_1$–C$_6$ bromoalkylthio, C$_1$–C$_6$ alkoxy, C$_2$–C$_6$ alkylthioalkyloxo, C$_2$–C$_6$ alkylsulfonylalkyloxo, C$_2$–C$_6$ alkoxyalkyloxo, C$_1$–C$_6$ chloroalkyloxo, C$_1$–C$_6$ bromoalkyloxo; R' is hydrogen, C$_1$–C$_5$ alkyl, C$_3$–C$_6$ cycloalkyl or C$_4$–C$_8$ alkylcycloalkyl with the proviso that the ring may contain at least one hetero atom such as nitrogen, oxygen or sulfur; n is an integer ranging from 1 to 6; R is a 5 or 6 member ring containing 1 or more hetero atoms, said ring being one selected from the group consisting of the following:

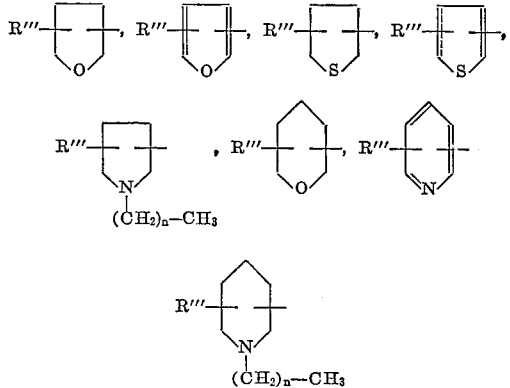

wherein R''' is one selected from the group consisting of H, C$_1$–C$_6$ alkyl, C$_3$–C$_6$ alkenyl, C$_1$–C$_6$ haloalkyl, Cl, Br, and NO$_2$; wherein n is an integer ranging from 0 to 3. Such compounds have shown outstanding pre- and post-emergence herbicidal activity.

The present invention is concerned with new compositions for influencing and, more particularly, inhibiting the growth of plants and with the methods of applying these compositions for influence in the growth of plants. In one aspect, this invention relates to triazines substituted with a saturated or unsaturated (5 or 6 membered) heterocyclic alkylamino group containing one or more heteroatoms such as O, N and S, and their utility as pesticides.

The discovery of triazine herbicides in the early 1950's led to several very successful commercial herbicides such as 2-chloro-4-ethylamino - 6 - isopropylamino-s-triazine (Atrazine), 2 - chloro - 4,5 - bis(ethylamino)-s-triazine (Simazine), and 2 - chloro-4,6-bis(isopropylamino)-s-triazine (Propazine) which are described in U.S. Pat. 2,891,-855; and 2,4-bis(isopropylamino)-6-methylthio-s-triazine (Prometryne) and 2-ethylamino - 4 - isopropylamino-6-methylthio-s-triazine (Ametryne) which are covered in U.S. Pat. 2,909,420.

More recently, 2 - chloro-4-alkylamino-6-cyclopropylamino-s-triazines were claimed in U.S. Pat. 3,451,802. The claim is based on the particularly good post-emergent herbicidal activity and selectivity exhibited by triazines with a cyclopropylamino group, which is not found with closely related substituents, such as the cyclopropylmethylamino group.

The surprising observation has been made that diamino-s-triazine derivatives of the general formula:

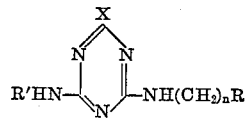

wherein X is one selected from the group consisting of Cl, Br, N$_3$, C$_1$–C$_6$ thioalkyl, C$_2$–C$_6$ alkylthioalkylthio, C$_2$–C$_6$ alkylsulfonylalkylthio, C$_2$–C$_6$ alkylsulfoxyalkylthio, C$_2$–C$_6$ alkoxyalkylthio, C$_1$–C$_6$ chloroalkylthio, C$_1$–C$_6$ bromoalkylthio, C$_1$–C$_6$ alkoxy, C$_2$–C$_6$ alkylthioalkyloxo, C$_2$–C$_6$ alkylsulfonylalkyloxo, C$_2$–C$_6$ alkoxyalkyloxo, C$_1$–C$_6$ chloroalkyloxo, C$_1$–C$_6$ bromoalkyloxo; R' is hydrogen, C$_1$–C$_5$ alkyl, C$_3$–C$_6$ cycloalkyl or alkylcycloalkyl with the proviso that the ring is capable of containing at least one hetero atom such as nitrogen, oxygen or sulfur; n is an integer ranging from 1 to 6; R is a five or six member ring containing 1 or more hetero atoms, said ring being one selected from the group consisting of the following:

wherein R''' is one selected from the group consisting of H, C$_1$–C$_6$ alkyl, C$_3$–C$_6$ alkenyl, C$_1$–C$_6$ haloalkyl, Cl, Br. and NO$_2$; wherein n is an integer ranging from 0 to 3, possess especially good herbicidal activity with selectivity on some crops. This activity is unexpected since cycloalkylalkylamino-triazines disclosed in U.S. 3,451,802 have been known not to show significant herbicidal activity.

Exemplary compounds corresponding to the above formula are as follows:

Cpd. No.

(1) ----- 2-ethylamino-4-methylthio-6-tetrahydrofurfurylamino-s-triazine.
(2) ----- 2-methylthio-4-isopropylamino-6-tetrahydrofurfuryl-amino-s triazine.
(3) ----- 2-tert-butylamino-4-methylthio-6-tertahydrofurfuryl-amino-s-triazine.
(4) ----- 2-sec-butylamino-4-methylthio-6-tetrahydrofurfuryl-amino-s-triazine.
(5) ----- 2-cyclopropylmethylamino-4-methylthio-6-tetrahydro-furfuryl-amino-s-triazine.
(6) ----- 2-methylamino-4-mehtylthio-6-tetrahydrofurfurylamino-s-triazine.
(7) ----- 2-ethylamino-4-methoxy-6-tetrahydrofurfurylamino-s-triazine.
(8) ----- 2-methoxy-4-isopropylamino-6-tetrahydrofurfurylamino-s-triazine.
(9) ----- 2-cyclopropylmethylamino-4-methoxy-6-tetrahydrofurfuryl-amino-s-triazine.
(10) ---- 2-chloro-4-ethylamino-6-tetrahydrofurfurylamino-s-triazine.
(11) ---- 2-chloro-4-isopropylamino-6-tetrahydrofurfurylamino-s-triazine.
(12) ---- 2-tert-butylamino-4-chloro-6-tetrahydrofurfurylamino-s-triazine.
(13) ---- 2-sec-butylamino-4-chloro-6-tetrahydrofurfurylamino-s-trizaine.
(14) ---- 2-chloro-4-methylamino-6-tetrahydrofurfurylamino-s-triazine.
(15) ---- 2-chloro-4-cyclopropylmethylamino-6-tetrahydrofurfuryl-amino-s-triazine.
(16) ---- 2-azido-4-ethylamino-6-tetrahydrofurfurylamino-s-triazine.
(17) ---- 2-azido-4-isoprpoylamino-6-tetrahydrofurfurylamino-s-triazine.
(18) ---- 2-(methylthiomethylthio)-4-isopropylamino-6-tetrahydrofurfurylamino-s-triazine.
(19) ---- 2-(methylthioethylthio)-4-isopropylamino-6-tetrahydrofurfurylamino-s-triazine.

TABLE—Continued

Cpd. No.

(20) 2-chloro-4,6-bis(tetrahydrofurfurylamino)-s-triazine.
(21) 2-methoxy-4,6-bis(tetrahydrofurfurylamino)-s-triazine.
(22) 2-ethylamino-4-furfurylamino-6-methylthio-s-triazine.
(23) 2-ethylamino-4-furfurylamino-6-methoxy-s-triazine.
(24) 2-tert-butyl-4-furfurylamino-6-methoxy-s-triazine.
(25) 2-furfurylamino-4-methoxy-6-methylamino-s-triazine.
(26) 2-chloro-4-ethylamino-6-furfurylamino-s-triazine.
(27) 2-tert-butyl-4-chloro-6-tetrahydrofurfurylamino-s-triazine.
(28) 2-chloro-4-furfurylamino-6-methylamino-s-triazine.
(29) 2-chloro-4,6-bis-(2-thienylmethylamino)-s-triazine.
(30) 2-ethylamino-4-methoxy-6-[2-(2-tetrahydrofuranyl)-ethylamino]-s-triazine.
(31) 2-isohexylamino-4-methylthio-6-tetrahydrofurfurylamino-s-triazine.
(32) 2-azido-4-neopentylamino-6-tetrahydrofurfurylamino-s-triazine.
(33) 2-chloro-4-isopropylamino-6-(2-thiolanylmethylamino)-s-triazine.
(34) 2-methoxy-4-methylamino-6-(2-thiolanylmethylamino)-s-triazine.
(35) 2-ethylamino-4-methylthio-6-(2-thiolanylmethylamino)-s-triazine.
(36) 2-chloro-4-ethylamino-6-(2-thienylmethylamino)-s-triazine.
(37) 2-tert-butylamino-4-methoxy-6-(2-thienylmethylamino)-s-triazine.
(38) 2-methylamino-4-methylthio-6-(2-thienylmethylamino)-s-triazine.
(39) 2-azido-4-sec-butylamino-6-[2-(tetrahydropyranyl)-methylamino]-s-triazine.
(40) 2-methoxy-4-methylamino-6-[2-(tetrahydropyranyl)-methylamino]-s-triazine.
(41) 2-tert-butylamino-4-methylthio-6-[2-(tetrahydropyranyl)-methylamino]-s-triazine.
(42) 2-isoamylamino-4-chloro-6-($\alpha$-picolinylamino)-s-triazine.
(43) 2-ethylamino-4-methoxy-6-($\alpha$-picolinylamino)-s-triazine.
(44) 2-methylthio-4-neopentylamino-6-($\alpha$-picolinylamino)-s-triazine.
(45) 2-azido-4-sec-butylamino-6-[2-(N-methylpyrrolidinyl)-methylamino]-s-triazine.
(46) 2-methoxy-4-isopropylamino-6-[2-(N-isoamylpyrrolidinyl)-methylamino]-s-triazine.
(47) 2-butylamino-4-methylthio-6-[2-(N-propylpyrrolidinyl)-methylamino]-s-triazine.
(48) 2-chloro-4-propylamino-6-[2-(N-ethylpiperidinyl)-methylamino]-s-triazine.
(49) 2-methoxy-4-methylamino-6-[2-(N-isopropylpiperidinyl)-methylamino]-s-triazine.
(50) 2-isohexylamino-4-methylthio-6-[2-(N-methylpiperidinyl)-methylamino]-s-triazine.

The following procedure, which employs commercially available starting materials, can be taken as illustrative of the general method of preparation of the novel triazine herbicides of this invention. The method is presented schematically as follows:

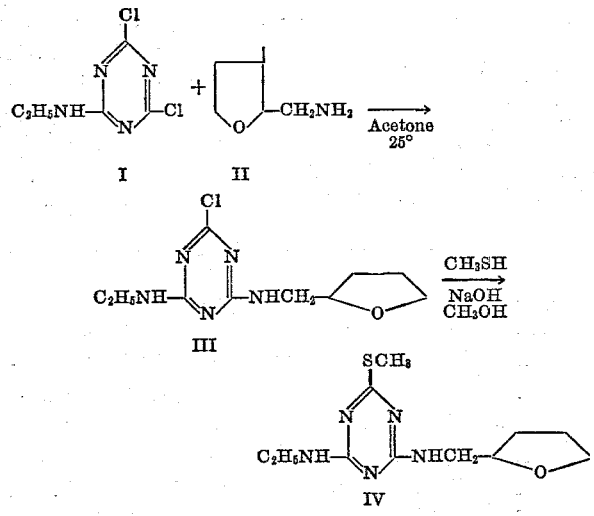

The mole ratio of Compound I to Compound II in the first reaction ranges from 1:1 to 1:2. In the event that it is 1:1, there must be present at least one equivalent of a base such as sodium bicarbonate. Preferably, a ratio of one mole of Compound I to two moles of Compund II is employed. The solvent can be either acetone or a mixture of acetone and water, preferably acetone in the temperature ranges from 10 to 50° C., preferably from 20 to 30° C. For the conversion of III to IV, the mole ratio of Compound III to the sodium salt of the mercaptan is 1:1 to 1:2 and preferably 1:1.5. The solvent can be methanol, ethanol, ethyleneglycol, 2,2-oxydiethanol monoglycene. Preferably, the solvent is ethanol and the temperature can range from 30 to 100° C., preferably from 50 to 60° C.

These compounds are excellently suitable as active ingredients for weed killers, both for the killing of weeds among cultivated plants (selective herbicides) as well as for the total elimination or inhibition of undesired plant growth (overall toxic herbicides). The word "weed" here also means undesired cultivated plants, e.g., those which have been previously planted or those which are planted in neighboring areas. In addition, the diamino-s-triazine derivatives as defined above, also exert other inhibitory influences on the plant growth and may be used, for example, for defoliation, acceleration of ripeness by dessication, e.g., in potato plants, also blossom thinning, retardation of blossoming, prolongation of the harvesting period and storing propensities. Some of these compounds display strong fungicidal activity.

As previously noted, the present diamino-s-triazine derivatives are useful as pesticides, particularly as herbicides and fungicides. When so used, the biologically active compounds are preferably formulated with a suitable carrier or diluent or combinations thereof.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite, etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the diamino-s-triazine derivatives of the present invention.

For some purposes, a resinous or waxy carrier can be used, preferably one which is solvent soluble or thermoplastic, including fusible materials. Examples of such carriers are natural or synthetic resins such as a coumarone resin, rosin, copal, shellac, damar, polyvinyl chloride, styrene polymers and copolymers, a solid grade of polychlorophenol such as is available under the registered trademark "Arocolor," a bitumen, an asphaltite, a wax for example beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and, if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecylbenzenesulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution. Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc., or dosage level, exposure times, test plants used, etc. by which the compounds and/or compositions described and claimed are prepared and/or used.

EXAMPLE 1

Preparation of 2,4-dichloro-6-tetrahydrofurfurylamino-s-triazine

A solution of 27.5 g. of tetrahydrofurfurylamine in 50 ml. of acetone was added to a stirred solution of 25 g. cyanuric chloride in 150 ml. of acetone at −10 to −20° over ½ hour. The mixture was stirred one hour at −10°. The acetone was removed under reduced pressure. The residue was taken up in 1 l. of chloroform, washed three times with 250 ml. of water, dried over magnesium sulfate and filtered. The chloroform was removed under reduced pressure and the resulting product was recrystallized from benzene-hexane affording 20.3 g. of 2,4-dichloro-6-tetrahydrofurfurylamino-s-triazine, M.P. 98–100° C.

*Elemental analysis.*—Calculated (percent): C, 38.57; H, 4.05; N, 22.49. Found (percent): C, 38.93; H, 4.26; N, 22.47.

EXAMPLE 2

Preparation of 2,4-dichloro-6-furfurylamino-s-triazine

The procedure described in Example 1 was employed. The product, 2,4-dichloro-6-furfurylamino-s-triazine, had M.P. 106–108° C. The structure was verified by NMR and infrared.

The identity of these compounds was established by NMR and infrared spectroscopy and/or elemental analysis.

TABLE I

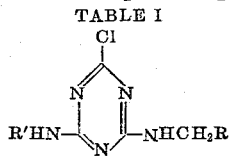

| Compound number | R' | R | M.P., degrees | Calculated C | H | N | Found C | H | N |
|---|---|---|---|---|---|---|---|---|---|
| 11 | CH(CH₃)₂ | (furan) | Oil | Structure verified by NMR, IR | | | | | |
| 12 | C(CH₃)₃ | Same as above | (¹) | 50.43 | 7.05 | 24.51 | 50.41 | 7.27 | 24.64 |
| 13 | CH(CH₃)CH₂CH₃ | do | 93–105 | 50.43 | 7.05 | 24.51 | 50.77 | 7.15 | 24.26 |
| 14 | CH₃ | do | 178–180 | 44.35 | 5.79 | 28.74 | 44.75 | 5.98 | 25.23 |
| 15 | CH₂–(cyclopropyl) | do | 193–195 | 50.79 | 6.39 | 24.68 | 50.86 | 6.51 | 24.46 |
| 20 | CH₂–(tetrahydrofuran) | do | 183–185 | Structure verified by NMR, IR | | | | | |
| 26 | CH₂CH₃ | do | 195–197 | Structure verified by NMR, IR | | | | | |
| 27 | C(CH₃)₃ | do | 118–120 | Structure verified by NMR, IR | | | | | |
| 28 | CH₃ | do | 224–226 | Structure verified by NMR, IR | | | | | |

¹ B.P. 185/1 mm.

EXAMPLE 3

Preparation of 2-chloro-4-ethylamino-6-tetrahydrofurfurylamino-s-triazine (No. 10)

A solution of 51 g. of tetrahydrofurfurylamine in 175 ml. acetone was added over a period of 20 minutes to 48 g. of 2,4-dichloro-6-ethylamino-s-triazine in 350 ml. of acetone at 15–20°. The mixture was stirred one hour at 25°. The acetone was removed under reduced pressure. The residue was taken up in 3 l. of chloroform, washed three times with 500 ml. of water, dried over magnesium sulfate, and filtered. The chloroform was removed under reduced pressure affording 50 g. of 2-chloro-4-ethylamino-6-tetrahydrofurfuryl-s-triazine, M.P. 165–167.5° C.

Recrystallization from ether-hexane afforded material with M.P. 166–168° C.

*Elemental analysis.*—Calculated (percent): C, 46.60; H, 6.26; N, 27.18. Found (percent): C, 46.94; H, 6.57; N, 27.83.

EXAMPLE 4

A number of 2-chloro-s-triazines substituted with amines in the 4 and 6 position were prepared utilizing the method described in Example 2. The compounds prepared and their physical properties are listed in Table I.

EXAMPLE 5

Preparation of 2-ethylamino-4-methylthio-6-tetrahydrofurfurylamino-s-triazine

A solution of 50 g. of sodium hydroxide in 800 ml. of methanol was cooled in a Dry Ice-acetone bath and charged with 60 g. of methanethiol. The resulting solution was added to a mixture of 200 g. o f2-chloro-4-ethylamino-6-tetrahydrofurfurylamino-s-triazine in 600 ml. of methanol. The mixture was heated at 55° for 15 hours. The methanol was removed under reduced pressure. The residue was taken up in 1.5 l. of xylene, washed three times with 250 ml. water, dried over magnesium sulfate, filtered. Removal of the xylene under reduced pressure afforded 200 g. of a yellow viscous oil, 2-ethylamino-4-methylthio-6-tetrahydrofurfurylamino - s - triazine. Semi-crystalline material obtained from a concentrated xylene solution had M.P. 62–67°.

*Elemental analysis.*—Calculated (percent): C, 49.04; H, 7.11; N, 26.00. Found (percent): C, 49.00; H, 7.18; N, 26.13.

EXAMPLE 6

A number of 2-methylthio-s-triazines substituted with amines in the 4 and 6 position were prepared utilizing the method described in Example 5. The compounds prepared and their physical properties are listed in Table II. The identity of these compounds was established by NMR and infrared spectroscopy.

TABLE II

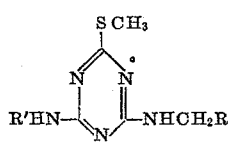

| Compound number | R' | R | M.P., degrees | Calculated C | H | N | Found C | H | N |
|---|---|---|---|---|---|---|---|---|---|
| 2 | CH(CH₃)₂ | (furan) | Oil | 50.85 | 7.47 | 24.71 | 52.59 | 7.50 | 23.83 |
| 3 | C(CH₃)₃ | Same as above | Oil | Structure verified by NMR, IR | | | | | |
| 4 | CH(CH₃)CH₂CH₃ | do | Oil | Structure verified by NMR, IR | | | | | |
| 5 | CH₂–(cyclopropyl) | do | Oil | Structure verified by NMR, IR | | | | | |
| 6 | CH₃ | do | Oil | Structure verified by NMR, IR | | | | | |
| 22 | CH₂CH₃ | do | 88–92 | Structure verified by NMR, IR | | | | | |

EXAMPLE 7

Preparation of 2-ethylamino-4-methoxy-6-tetrahydrofurfurylamino-s-triazine

A solution of 4 g. of sodium methoxide in 25 ml. of methanol was added to 8 g. of 2-chloro-4-ethylamino-6-tetrahydrofurfurylamino-s-triazine in 10 ml. of methanol. The mixture was heated at 55° for 15 hours. The methanol was removed under reduced pressure. The residue was taken up in chloroform, washed three times with water, dried over magnesium sulfate, filtered. Removal of the chloroform under reduced pressure afforded 5 g. of viscous, oily 2-ethylamino-4-methoxy - 6 - tetrahydrofurfurylamino-s-triazine.

*Elemental analysis.*—Calculated (percent): C, 52.16; H, 7.56; N, 27.65. Found (percent): C, 51.75; H, 7.61; N, 27.79.

EXAMPLE 8

A number of 2-methoxy-s-triazines substituted with amines in the 4 and 6 position were prepared utilizing the method described in Example 7. The compounds prepared and their physical properties are listed in Table III. The identity of these compounds was established by NMR and infrared spectroscopy and/or elemental analysis.

EXAMPLE 11

Preparation of 2-mercapto-4-isopropylamino-6-tetrahydrofurfurylamino-s-triazine

A solution of 19 g. of 2-chloro-4-isopropylamino-6-tetrahydrofurfurylamino-s-triazine in 240 ml. of N,N-dimethylformamide was heated to 100°. A solution of 10 g. of sodium hydrosulfide hydrate in 25 ml. of water was added dropwise. The resulting dark green solution was heated at 100° for 1.5 hours, then at reflux for one hour. The cooled mixture was poured into 1.2 l. of water and filtered. The solid was dissolved in 500 ml. of chloroform, washed two times with 100 ml. of water, dried over magnesium sulfate, and filtered. Removal of the chloroform under reduced pressure afforded 15.1 g. of 2-mercapto-4-isopropylamino-6-tetrahydrofurfurylamino-s-triazine, M.P. 205–208°.

EXAMPLE 12

Preparation of 2 - (methylthiomethylthio) - 4 - isopropylamino-6-tetrahydrofurfurylamino-s-triazine A solution of 1.0 g. sodium hydroxide in 15 ml. of water was added to 6 g. of 2-mercapto-4-isopropylamino-6-tetrahydrofurfurylamino-s-triazine. The mixture was stirred for 15 minutes and was then treated dropwise with 4 g. of chlorodimethylsulfide in 20 ml. of ethanol. The resulting

TABLE III

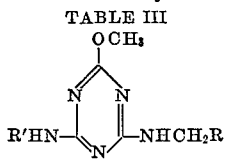

| Compound number | R' | R | M.P., degrees | Analysis Calculated | | | Found | | |
|---|---|---|---|---|---|---|---|---|---|
| | | | | C | H | N | C | H | N |
| 8 | CH(CH₃)₂ | (furyl) | Oil | 53.91 | 7.92 | 26.20 | 54.32 | 8.14 | 25.68 |
| 9 | CH₂-(cyclopropyl) | Same as above | Oil | 55.89 | 7.58 | 25.07 | 55.98 | 7.27 | 25.08 |
| 21 | CH₂-(tetrahydrofuryl) | do | Oil | Structure verified by NMR, IR | | | | | |
| 23 | CH₂CH₃ | do | 192–196 | Structure verified by NMR, IR | | | | | |
| 24 | C(CH₃)₃ | do | Oil | Structure verified by NMR, IR | | | | | |
| 25 | CH₃ | do | | Structure verified by NMR, IR | | | | | |

EXAMPLE 9

Preparation of 2-azido-4-ethylamino-6-tetrahydrofurfurylamino-s-triazine

A mixture of 8 g. of 2-chloro-4-ethylamino-6-tetrahydrofurfurylamino-s-triazine in 25 ml. of dioxane was treated with 3.9 g. of sodium azide in 12 ml. of water and heated at 75° for 89 hours. The mixture was cooled, poured into 100 ml. of water, and filtered. The solid was recrystallized from benzene-hexane, affording 6 g. of 2-azido - 4 - ethylamino - 6 - tetrahydrofurfurylamino-s-triazine, M.P. 111–114° C.

*Elemental analysis.*—Calculated (percent): C, 45.44; H, 6.10; N, 42.40. Found (percent): C, 46.49; H, 6.62; N, 41.95.

EXAMPLE 10

Preparation of 2-azido-4-isopropylamino-6-tetrahydrofurfurylamino-s-triazine

The procedure described in Example 9 was employed. The product, 2-azido-4-isopropylamino - 6 - tetrahydrofurfurylamino-s-triazine, had M.P. 90–93°. The structure was verified by NMR and infrared spectroscopy.

*Elemental analysis.*—Calculated (percent): C, 47.47; H, 6.52; N, 40.26. Found (percent): C, 48.12; H, 6.82; N, 39.62.

mixture was heated at 70° for 3.5 hours. The solvents were removed under reduced pressure. The residue was taken up in 250 ml. of chloroform, washed two times with 50 ml. of water, dried over magnesium sulfate, filtered. Removal of the solvent afforded 5.5 g. of oily 2-(methylthiomethylthio) - 4 - isopropylamino - 6-tetrahydrofurfurylamino-s-triazine. The structure of the product was verified by NMR and infrared spectroscopy.

EXAMPLE 13

2-(methylthioethylthio)-4-isopropylamino-6-tetrahydrofurfurylamino-s-triazine

The procedure described in Example 12 was employed. The product, 2-(methylthioethylthio)-4-isopropylamino-6-tetrahydrofurfurylamino-s-triazine, was a viscous oil. The structure was verified by NMR and infrared spectroscopy.

TESTING PROCEDURES

Representative diamino-s-triazine derivatives from those prepared in the previous examples were evaluated for pre-emergence herbicidal activity in this example. The test procedure employed was as follows:

Two flats seeded with six crops (cotton, soybean, alfalfa, corn, rice and oats) and six weeds (mustard, morning glory, zinnia, crabgrass, barnyard grass, and foxtail) were sprayed with a formulation containing the test chemical at a rate equivalent to 10, 5, or 4 lbs./acre, as specified in the table. The test chemicals were sprayed as acetone solutions or very small particle acetone suspensions onto the test plants. Sprayers were calibrated to deliver a certain volume of liquid and the calculated amount of active ingredient which would give a rate corresponding to the indicated lbs./acre. The flats were then held in the greenhouse and a response rated after 12 days to 16 days. Response was rated by a scale of 0–10. The 0–10 scale is defined as : 0=no injury; 1–3=slight injury; 4–6=moderate injury, plants may die; 7–9=severe injury, plants will probably die; and 10=all plants dead (complete kill).

POST-EMERGENCE ACTIVITY

In this example representative diamino-s-triazine derivatives of this invention were evaluated for post-emergence activity. The test procedure was as follows:

Flats were seeded, as described in the previous example, and held until the first true leaves had appeared on all plants, which were then sprayed in the same fashion as in the preceding example at a rate of 5 or 4 lbs./acre, as specified in the table. The plant responses were rated 12–16 days after treatment on the same scale as described previously. The test results are shown in Table IV.

TABLE IV.—PRE-EMERGENCY ACTIVITY $$R'HN-\underset{\underset{X}{\big|}}{\underset{N}{\overset{N}{\diagup}}}\overset{N}{\diagdown}-NHCH_2R$$

| No. | X | R' | R | Rate, lb./a. | Barn-yard grass | Crab-grass | Foxtail | Zinnia | Mustard | Morning glory | Cotton | Soy-bean | Alfalfa | Corn | Rice | Oats |
|---|---|---|---|---|---|---|---|---|---|---|---|---|---|---|---|---|
| 1 | SCH$_3$ | CH$_2$CH$_3$ | ⟨furanyl⟩ | 10 | 9 | 8 | 10 | 10 | 10 | 10 | 0 | 0 | 9 | 0 | 0 | 0 |
| 2 | SCH$_3$ | CH(CH$_3$)$_2$ | Same as above | 4 | 6 | 10 | 10 | 10 | 10 | 6 | 0 | 3 | 1 | 0 | 1 | 3 |
| 7 | OCH$_3$ | CH(CH$_3$)$_2$ | do | 4 | 3 | 9 | 8 | 10 | 6 | 5 | 1 | 5 | 0 | 0 | 1 | 3 |
| 8 | OCH$_3$ | CH$_2$CH$_3$ | do | 4 | 7 | 9 | 10 | 10 | 9 | 5 | 0 | 0 | 3 | 0 | 0 | 5 |
| 10 | Cl | CH(CH$_3$)$_2$ | do | 4 | 2 | 7 | 5 | 9 | 10 | 10 | 1 | 8 | 10 | 0 | 4 | 5 |
| 11 | Cl | CH$_2$CH$_3$ | do | 4 | 1 | 5 | 8 | 10 | 8 | 8 | 10 | 1 | 5 | 2 | 0 | 7 |
| 1 | SCH$_3$ | CH$_2$CH$_3$ | do | 5 | 10 | 10 | 10 | 10 | 10 | 10 | 9 | 10 | 10 | 8 | 5 | 7 |
| 2 | SCH$_3$ | CH(CH$_3$)$_2$ | do | 4 | 10 | 10 | 10 | 10 | 10 | 10 | 10 | 10 | 10 | 10 | 5 | 6 |
| 3 | SCH$_3$ | C(CH$_3$)$_3$ | do | 5 | 10 | 10 | 10 | 10 | 10 | 10 | 10 | 10 | 10 | 10 | 7 | 9 |
| 4 | SCH$_3$ | CH(CH$_3$)CH$_2$CH$_3$ | do | 5 | 10 | 10 | 10 | 10 | 10 | 10 | 10 | 10 | 10 | 10 | 9 | 9 |
| 5 | SCH$_3$ | CH$_3$ | ⟨CH-furanyl⟩ | 5 | 10 | 10 | 9 | 10 | 10 | 10 | 10 | 10 | 10 | 10 | 6 | 9 |
| 6 | SCH$_3$ | CH$_3$ | do | 5 | 9 | 10 | 10 | 10 | 10 | 10 | 3 | 10 | 10 | 3 | 6 | 8 |
| 7 | OCH$_3$ | CH$_3$ | do | 5 | 9 | 10 | 10 | 10 | 10 | 10 | 10 | 10 | 10 | 3 | 2 | 4 |
| 8 | OCH$_3$ | CH(CH$_3$)$_2$ | do | 4 | 10 | 9 | 9 | 10 | 10 | 10 | 10 | 10 | 10 | 3 | 5 | 7 |
| 9 | OCH$_3$ | CH$_2$ | ⟨CH-furanyl⟩ | 5 | 10 | 10 | 9 | 10 | 10 | 10 | 10 | 10 | 10 | 10 | 7 | 5 |
| 10 | Cl | CH$_2$CH$_3$ | do | 5 | 8 | 10 | 9 | 10 | 10 | 9 | 2 | 9 | 10 | 3 | 4 | 4 |
| 11 | Cl | CH(CH$_3$)$_2$ | do | 5 | 9 | 7 | 10 | 10 | 10 | 9 | 3 | 10 | 10 | 4 | 8 | 2 |
| 12 | Cl | C(CH$_3$)$_3$ | do | 5 | 7 | 9 | 8 | 10 | 10 | 9 | 6 | 7 | 9 | 2 | 3 | 2 |
| 13 | Cl | CH(CH$_3$)CH$_2$CH$_3$ | do | 5 | 6 | 6 | 6 | 10 | 10 | 7 | 4 | 10 | 9 | 3 | 3 | 3 |
| 17 | Cl | CH$_3$ | do | 5 | 9 | 9 | 10 | 10 | 10 | 8 | 3 | 9 | 10 | 3 | 4 | 4 |
| 16 | N$_3$ | CH(CH$_3$) | do | 4 | 10 | 10 | 10 | 10 | 10 | 10 | 3 | 7 | 10 | 10 | 5 | 5 |
| 22 | SCH$_3$ | CH$_2$CH$_3$ | do | 5 | 10 | 10 | 10 | 10 | 10 | 10 | 7 | 10 | 10 | 9 | 6 | 10 |
| 23 | OCH$_3$ | CH$_2$CH$_3$ | Same as above | 5 | 9 | 9 | 9 | 9 | 9 | 9 | 0 | 7 | 9 | 5 | 3 | 3 |

FOLIAR FUNGICIDAL ACTIVITY—TEST PROCEDURE (1) Tomato early blight protectant

Step 1: Tomato plants 4–5 weeks old are placed on a revolving turntable and sprayed with a formulation containing 200 p.p.m. of the test chemical. As soon as the spray deposit has dried, the plants are inoculated with a spore suspension of the early blight fungus (*Alternaria solani*) and placed in an incubation chamber for 24 hours, after which they are removed and held until lesions have developed. Visual ratings of control (0–10) are then made, and those compounds giving 85% or better control pass to secondary testing.

Step 2: Same as above except concentration of the chemical is lowered in the dilution series of 100, 20 and 4 p.p.m. Maneb is used as a standard in this test. A typical Maneb dilution series:

| P.p.m.: | Percent control |
|---|---|
| 500 | 100 |
| 100 | 100 |
| 20 | 86 |
| 4 | 78 |
| 1 | 66 |

(2) Bean powdery mildew—Eradicant

Step 1: Bean plants with fully expanded primary leaves are inoculated with spores of the powdery mildew fungus (*Erysiphe polygoni*) prior to application of test chemicals. Chemicals are applied at a concentration of 200 p.p.m. using the same method as in the early blight test above. After the spray has dried, the plants are removed to the greenhouse and held for a period of 7–10 days at the end of which time the amount of mildew on the primary leaves is rated. Ratings are on a scale of 0–10, where 0=no control, 10=100% control. Ratings of 8–10 in the primary test justify taking the chemical to the next step.

Step 2: Same test as above, except that the minimum effect dose is determined in the dilution series of 100, 20 and 4 p.p.m. The standard for this test is Karathane. Typical values for Karathane:

| P.p.m.: | Control rating |
|---|---|
| 100 | 10 |
| 20 | 8 |
| 4 | 6 |

(3) Bean rust—Eradicant

Step 1: Pinto bean plants with fully expanded primary leaves are inoculated with spores of the bean rust fungus (*Uromyces phaseoli*) and incubated for 24 hours. Chemicals are then applied at a concentration of 200 p.p.m. using the same method as the early blight test above. After the spray has dried, the plants are removed to the greenhouse and held for a period of 7–10 days. At the end of this time, the amount of rust is rated on a scale of 0–10, where 0=no control, 10=complete control. Compounds having an 8–10 rating pass to secondary testing.

Step 2: Same test as above except that the minimum effective dose is determined in a dilution series of 100, 20 and 4 p.p.m. The standard in the test is Glyodin.

(4) Bean rust—Systemic eradicant

Step 1: Pinto bean plants are inoculated 24 hours prior to use as above, and the soil in the pot is treated with 20 ml. of a formulation of the test chemical at 200 p.p.m. The plants are removed to the greenhouse and held for a period of 7–10 days, at the end of which time the amount of rust is rated on the same scale as above. Compounds giving 8–10 ratings pass on to the next step.

Step 2: Same test as above except that the minimum effective dose is determined in a dilution series of 100, 20 and 4 p.p.m. Plantvax is used as the commercial standard in this test.

The following table illustrates the foliar fungicidal activity of some of the test compounds.

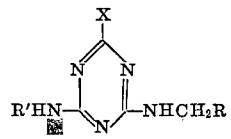

FOLIAR FUNGICIDE ACTIVITY

| Number | X | R' | R | Rate p.p.m. | Early blight | Bean mildew | Bean rust Spray | Bean rust Systemic |
|---|---|---|---|---|---|---|---|---|
| 1 | SCH₃ | CH₂CH₃ | —cyclopentyl-O | 200 | | | 10 | |
| 2 | SCH₃ | CH(CH₃)₂ | —cyclopentyl-O | 200 | | | 10 | |
| 5 | SCH₃ | CH₂-cyclopropyl | —cyclopentyl-O | 200 | | 10 | | |
| 6 | SCH₃ | CH₃ | —cyclopentyl-O | 200 | | 10 | | |
| 7 | OCH₃ | CH₂CH₃ | —cyclopentyl-O | 200 | | | 5 | 10 |
| 8 | OCH₃ | CH(CH₃)₂ | —cyclopentyl-O | 200 | 4 | 10 | 7 | |
| 12 | Cl | C(CH₃)₃ | —cyclopentyl-O | 200 | | | 10 | 10 |
| 17 | N₃ | CH(CH₃)₂ | —cyclopentyl-O | 200 | | 10 | | 10 |

What is claimed is:
1. A compound of the formula:

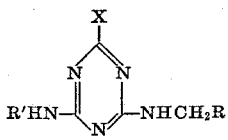

where in X is Cl, $N_3$, $CH_3S$, $CH_3SCH_2S$, $CH_3SCH_2CH_2S$, or $CH_3O$; R' is alkyl of from 1 to 6 carbon atoms, cyclopropylmethyl or tetrahydrofurfuryl; and R is

or

2. A compound according to claim 1, 2-ethylamino-4-furfurylamino-6-methylthio-s-triazine.
3. A compound according to claim 1, 2-ethylamino-4-furfurylamino-6-methoxy-s-triazine.
4. A compound according to claim 1 in which R is

5. A compound according to claim 4, 2-ethylamino-4-methylthio-6-tetrahydrofurfurylamino-s-triazine.
6. A compound according to claim 4, 2-methylthio-4-isopropylamino-6-tetrahydrofurfurylamino-s-triazine.
7. A compound according to claim 4, 2-tert-butyl-amino-4-methylthio - 6 - tetrahydrofurfurylamino - s -triazine.
8. A compound according to claim 4, 2-sec-butyl-amino-4-methylthio-6-tetrahydrofurfurylamino - s - triazine.
9. A compound according to claim 4, 2-cyclopropylmethylamino-4-methylthio - 6 - tetrahydrofurfurylamino-s-triazine.
10. A compound according to claim 4, 2-methylamino-4-methylthio-6-tetrahydrofurfurylamino-s-triazine.
11. A compound according to claim 4, 2-ethylamino-4-methoxy-6-tetrahydrofurfuryamino-s-triazine.
12. A compound according to claim 4, 2-methoxy-4-isopropylamino-6-tetrahydrofurfurylamino-s-triazine.
13. A compound according to claim 4, 2-cyclopropylmethylamino-4-methoxy - 6 - tetrahydrofurfurylamino-s-triazine.
14. A compound according to claim 4, 2-chloro-4-ethylamino-6-tetrahydrofurfurylamino-s-triazine.
15. A compound according to claim 4, 2-chloro-4-isopropylamino-6-tetrahydrofurfurylamino-s-triazine.
16. A compound according to claim 4, 2 - tert-butyl-amino-4-chloro-6-tetrahydrofurfurylamino-s-triazine.
17. A compound according to claim 4, 2-sec-butyl-amino-4-chloro-6-tetrahydrofurfurylamino-s-triazine.
18. A compound according to claim 4, 2-chloro-4-methylamino-6-tetrahydrofurfurylamino-s-triazine.
19. A compound according to claim 4, 2-chloro-4-cyclopropylmethylamino-6-tetrahydrofurfurylamino-s-triazine.
20. A compound according to claim 4, 2-azido-4-ethylamino-6-tetrahydrofurfurylamino-s-triazine.
21. A compound according to claim 4, 2-azido-4-isopropylamino-6-tetrahydrofurfurylamino-s-triazine.

References Cited
UNITED STATES PATENTS
3,530,121  9/1970  Heimberger ----- 260—249.8 X
3,580,912  5/1971  Heimberger et al. -- 260—249.8 X JOHN M. FORD, Primary Examiner U.S. Cl. X.R.
71—93; 260—249.8